W. P. M. GRELCK.
HOMOGENIZING VALVE.
APPLICATION FILED MAR. 2, 1914.
1,131,368. Patented Mar. 9, 1915.
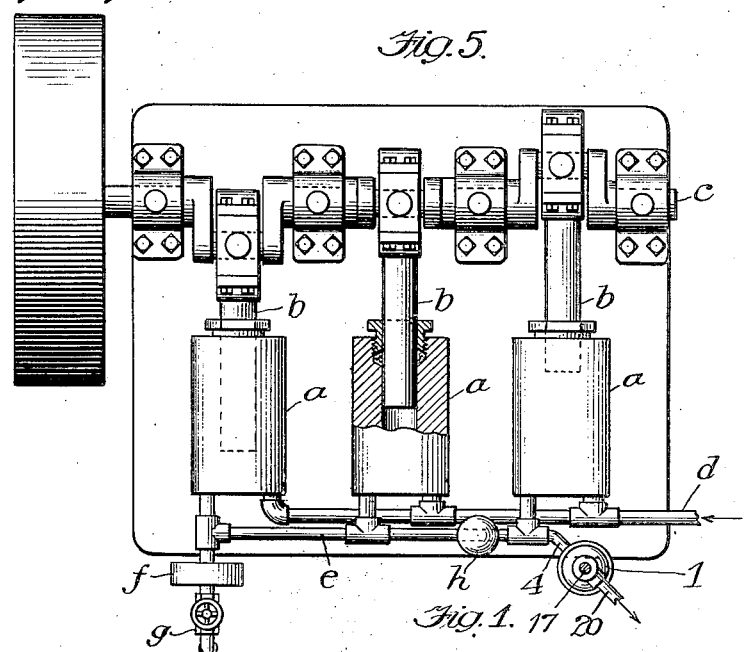
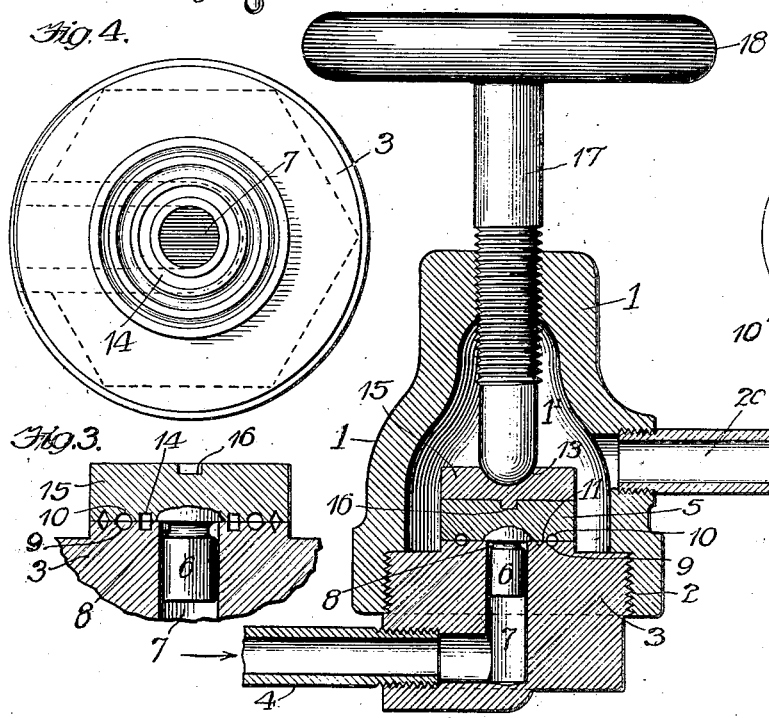
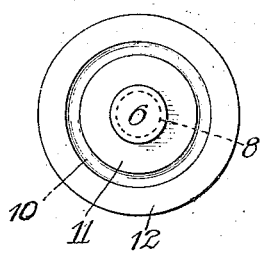
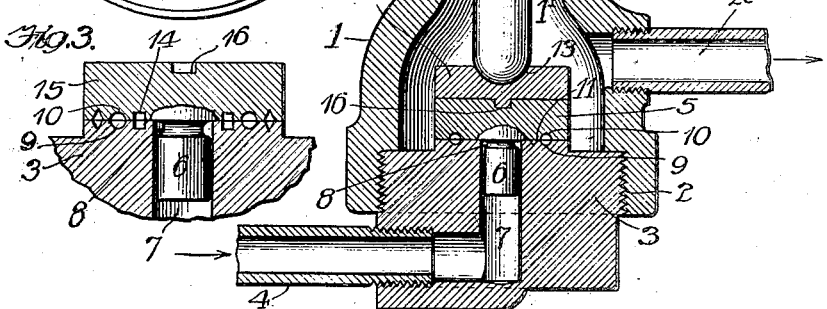
Witnesses
Martin H. Olsen.
A. S. Phillips.
Inventor
William P. M. Grelck
By Clarence K. Chamberlain

UNITED STATES PATENT OFFICE.

WILLIAM P. M. GRELCK, OF ELGIN, ILLINOIS.

HOMOGENIZING-VALVE.

1,131,368.     Specification of Letters Patent.     Patented Mar. 9, 1915.

Application filed March 2, 1914. Serial No. 821,897.

*To all whom it may concern:*

Be it known that I, WILLIAM P. M. GRELCK, a citizen of the United States, and a resident of the city of Elgin, in the county of Kane and State of Illinois, have invented certain new and useful Improvements in Homogenizing-Valves, of which the following is a specification.

My invention relates to apparatus which is used for breaking down and making smaller or modifying the fat globules of milk and of other fats or fatty compounds.

The object thereof is to provide an improved homogenizing valve which is simple in construction, which will provide a large area of effective surface free from unnecessary curves or variations of shape or form, which shall be readily adjustable even to the minutest apertures, which shall have a large capacity for passing fluid rapidly therethrough, and which shall be positive in its action and not subject to variations dependent upon varying pressures in the pumping mechanism.

The principles of my invention are illustrated in the drawings in which—

Figure 1 shows a vertical section of my improved homogenizing valve; Fig. 2 is a bottom view of the valve head and stem; Fig. 3 shows in enlarged cross section a modified form of the valve seat; Fig. 4 is a top view of Fig. 3. Fig. 5 is a top view of an homogenizing pump with my valve attached thereto.

Further describing the invention with reference to the drawings: 1 represents a casing provided at the lower extremity with an internal thread 2, into which may be screwed the valve seat 3. The said valve seat is apertured and threaded for a tubular connection through which fluid may be introduced to the valve through the pipe 4, connected to the pumping mechanism. A valve T-shaped in cross section and having the head 5 adapted to rest on the valve seat, and the stem 6 adapted to be received within the aperture 7 is placed within the casing. The valve stem, which moves somewhat freely within the said aperture, which acts as a guideway therefor is provided with an annular distributing groove 8 adjacent to the head and immediately therebeneath. The valve seat has a substantially plane face and the valve head is ground thereon to an accurate fit, thereby forming a plurality of plane coacting valve faces. These faces may and should be made of considerable width and in connection with the even distribution of material thereto, afforded by the distributing groove 8 on the valve stem, at which point the material is fed between the valve faces are especially efficient in acting on and breaking down the fat globules passed between them. Moreover by making the faces flat the necessary perfect fit between them is readily made and easily maintained. The efficiency of these faces may be greatly increased by providing them with one or more grooves placed transversely to the line of flow of the material passing between them. Such a groove in the valve seat is shown at 9 and a corresponding groove 10 should be formed in the under face of the head 5. The form of corresponding valve head and seat shown in Figs. 1 and 2 will be found very effective in the homogenizing of cream and butter fats. The distributing groove 8 and the face grooves 9 and 10 coöperate to make a perfectly even and balanced distribution over the faces 11 and 12. One or more grooves in the corresponding faces of the valve seat and head as illustrated in Fig. 3 may be provided to such an extent and in such form of cross section as the nature of the work to be performed may require and the judgment of the operator may dictate. In such case I prefer to make one pair of the grooves 14 with walls perpendicular to the valve faces. This is for the purpose of providing a lodgment for any small particles of foreign matter which might get access to the valve and by getting between the faces thereof prevent their proper coaction. A thrust block 15, having a lug 16 adapted to be received within a corresponding depression in the valve head rests on the latter. A screw threaded thrust rod 17 passes through the head of the casing 1, and the upper part of said thrust rod is provided with a hand wheel 18 by which the valve head may be positively held to its seat or released to any extent desired. An outlet 20 in the upper part of the casing is provided by which material which is passed through the valve may be conducted to any desired receptacle.

My improved valve is used in connection with a powerful pumping apparatus which may be of any desired construction, but a typical form of which is illustrated by the plan view in Fig. 5. This consists of three cylinders *a* with solid pistons *b* drawn by shaft *c* having cranks placed 120 degrees apart. It is provided with the usual inlet and outlet valves (not shown). The intake is through the pipe *a* and all the cylinders discharge into the common pipe *e* to an extension 4 of which my valve is attached. The discharge pipe should also be provided with a pressure gage *f*, a relief valve *g* and an air chamber *h*. The latter is of much importance, as my valve not being provided with a spring, it affords relief for over-pressure at a portion of each cylinder stroke while supplying additional force at low pressure points. When it is desired to use the valve the material to be treated, such as milk, is forced to the underside of the valve by means of the pumping apparatus. If the valve is tightly held in place no fluid will pass therethrough, the pressure being relieved by the relief valve *g*; but by loosening the screw adjustment the valve will be permitted to unseat and the fluid passing upward around the valve stem and being conducted to all parts of the valve equally, by the distributing ring 8, passes out between the faces of the valve and the valve seat. In such flow any inequality of distribution will be further overcome by the grooves 10, 14, etc., and after passing them will flow between the co-acting faces of the valve and the valve seat until it enters the chamber 1' within the shell 1, from which it flows out through the discharge opening 20.

Having thus fully described my invention, what I claim as new and desire to secure by Letters Patent, is—

1. An homogenizing valve having a stationary seat provided with a central inlet opening, a movable head to cover the seat having a stem projected into said inlet opening to provide against lateral displacement, and means for adjustably holding said head in vertical relation to the seat, the proximate portions of said head and seat being formed to provide a plurality of substantially plane co-acting faces.

2. An homogenizing valve having a stationary seat provided with a central inlet opening, a movable head to cover the seat, a stem having a distributing depression adjacent to the head projected into the said opening to provide against lateral displacement and means for adjustably holding said head in vertical relation to the seat, the proximate portions of said seat and head being formed to provide a plurality of substantially plane co-acting faces.

3. An homogenizing valve having a casing, a stationary valve seat in the casing provided with a central inlet opening, means for confining high pressure fluids to passage through said opening, a movable head to cover the seat, and means for adjustably holding said head in relation to the seat, the proximate portions of said head and seat being formed to provide a plurality of substantially plane co-acting faces, and one of said faces provided with an annular groove.

4. An homogenizing valve having a casing, a stationary valve seat in the casing provided with a central inlet opening, means for confining high pressure fluids to passage through said opening, a movable head to cover the seat, and means for adjustably holding said head in relation to the seat, the proximate portions of said head and seat being formed to provide a plurality of substantially plane co-acting faces, one of said faces provided with an annular groove and the other face provided with a similar groove facing the first.

5. An homogenizing valve having a casing, a stationary valve seat in the casing provided with a central inlet opening, means for confining high pressure fluids to passage through said opening, a movable head to cover the seat, and means for adjustably holding said head in relation to the seat, the proximate portions of said head and seat being formed to provide a plurality of substantially plane co-acting faces, the faces being provided with a plurality of pairs of annular grooves concentric with each other.

6. An homogenizing valve having a casing, a stationary valve seat in the casing provided with a central inlet opening, means for confining high pressure fluids to passage through said opening, a movable head to cover the seat and means for adjustably holding the said head in relation to the seat, the proximate portion of said head and seat being formed to provide substantially plane co-acting faces.

7. An homogenizing valve having a casing, a stationary valve seat in the casing provided with a central inlet opening, means for confining high pressure fluids to passage through said opening, a movable head to cover the seat, and means for adjustably holding the said head in relation to the seat, the proximate portions of said head and seat being formed to provide substantially plane co-acting faces, and one of said faces being provided with a groove having a wall substantially perpendicular to the said face.

8. An homogenizing valve having a seat provided with an inlet opening, a valve head having a plane face adapted to co-act with the face on the seat, a thrust block on the said head, means for mutual engagement between the thrust block and the head to prevent relative lateral displacement, and means acting on the said thrust block to limit the vertical displacement of the head from the seat.

In witness whereof, I have hereunto subscribed my name this 27th day of February, 1914, in the presence of two subscribing witnesses.

WILLIAM P. M. GRELCK.

Witnesses:
C. K. CHAMBERLAIN,
A. S. PHILLIPS.